(12) United States Patent
Piazzi et al.

(10) Patent No.: US 10,870,264 B2
(45) Date of Patent: Dec. 22, 2020

(54) COVER FILM, METHOD OF MAKING COVER FILM, AND METHOD OF USING COVER FILM FOR ENCLOSING COMPRESSED MATERIAL

(71) Applicant: RKW Agri GmbH & Co. KG, Frankenthal (DE)

(72) Inventors: Jurgen Piazzi, Michelstadt (DE); Jan Philip Eubeler, Grosskarlbach (DE); Thomas Steffen, Kalefeld (DE); Benjamin Kuhlmann, Northeim (DE)

(73) Assignee: RKW Agri GmbH & Co. KG, Frankenthal (DE)

( * ) Notice: Subject to any disclaimer, the term of this patent is extended or adjusted under 35 U.S.C. 154(b) by 26 days.

(21) Appl. No.: 16/306,720

(22) PCT Filed: May 31, 2017

(86) PCT No.: PCT/EP2017/063092
§ 371 (c)(1),
(2) Date: Dec. 3, 2018

(87) PCT Pub. No.: WO2017/211632
PCT Pub. Date: Dec. 14, 2017

(65) Prior Publication Data
US 2019/0126602 A1     May 2, 2019

(30) Foreign Application Priority Data
Jun. 8, 2016    (DE) .................... 10 2016 110 570

(51) Int. Cl.
*B32B 27/32*     (2006.01)
*B32B 27/08*     (2006.01)
(Continued)

(52) U.S. Cl.
CPC .......... *B32B 27/32* (2013.01); *A01F 15/0715* (2013.01); *B29C 48/0018* (2019.02);
(Continued)

(58) Field of Classification Search
CPC ................................................ A01F 2015/0745
See application file for complete search history.

(56) References Cited

U.S. PATENT DOCUMENTS 5,998,017 A * 12/1999 Eichbauer ............... B32B 27/32
428/343
2001/0014401 A1    8/2001 Bonke et al.
(Continued)

FOREIGN PATENT DOCUMENTS

WO     9826648    6/1998
WO     2008155129  12/2008
(Continued)

*Primary Examiner* — Stephen F. Gerrity
(74) *Attorney, Agent, or Firm* — Volpe Koenig (57) ABSTRACT

A cover film for the compressing of bales, characterized in that the cover film has been stretched and comprises an inner layer (1) and outer layers (2), wherein the inner layer (1) of the film comprises a copolymer of an ethylene and an α-olefin, wherein the α-olefin is selected from the group consisting of 1-butene, 1-hexene, 1-heptene, and 1-octene, and is used for copolymerization with the ethylene, wherein the copolymer is present in an amount of more than 5% by weight and less than 50% by weight of the inner layer (1) of the film, wherein the inner layer (1) further comprises a linear polyethylene, and wherein the outer layers (2) of the film fail to comprise any significant proportion of the copolymer.

23 Claims, 5 Drawing Sheets

(51) Int. Cl.
*C08J 5/18* (2006.01)
*B29C 48/00* (2019.01)
*B29C 48/10* (2019.01)
*B29C 48/21* (2019.01)
*A01F 15/07* (2006.01)
*B29C 55/00* (2006.01)
*B29C 55/28* (2006.01)
*B32B 1/08* (2006.01)
*B65B 11/00* (2006.01)
*B65B 27/12* (2006.01)
*C08L 23/06* (2006.01)
*B29L 23/00* (2006.01)

(52) U.S. Cl.
CPC ........ *B29C 48/0022* (2019.02); *B29C 48/022* (2019.02); *B29C 48/10* (2019.02); *B29C 48/21* (2019.02); *B29C 55/005* (2013.01); *B29C 55/28* (2013.01); *B32B 1/08* (2013.01); *B32B 27/08* (2013.01); *B32B 27/327* (2013.01); *B65B 11/00* (2013.01); *B65B 27/125* (2013.01); *C08J 5/18* (2013.01); *C08L 23/06* (2013.01); *A01F 2015/0745* (2013.01); *B29K 2023/06* (2013.01); *B29L 2023/001* (2013.01); *B32B 2250/03* (2013.01); *B32B 2250/24* (2013.01); *B32B 2250/40* (2013.01); *B32B 2270/00* (2013.01); *B32B 2274/00* (2013.01); *B32B 2307/514* (2013.01); *B32B 2307/516* (2013.01); *B32B 2410/00* (2013.01); *B65B 2011/002* (2013.01); *C08J 2323/06* (2013.01); *C08J 2323/08* (2013.01); *C08J 2423/08* (2013.01); *C08J 2423/20* (2013.01); *C08L 2203/16* (2013.01); *C08L 2205/025* (2013.01); *C08L 2207/04* (2013.01); *C08L 2207/066* (2013.01)

(56) References Cited

U.S. PATENT DOCUMENTS

| | | |
|---|---|---|
| 2003/0118853 A1 | 6/2003 | Cook et al. |
| 2005/0170194 A1 | 8/2005 | Breese |
| 2006/0210740 A1 | 9/2006 | Bekele |
| 2009/0269566 A1* | 10/2009 | Eichbauer et al. ..... B32B 27/32 428/220 |
| 2012/0028017 A1 | 2/2012 | Saraf et al. |
| 2013/0167486 A1* | 7/2013 | Aarnio et al. .......... B32B 27/08 53/477 |
| 2013/0224463 A1* | 8/2013 | Shirodkar et al. ......... C08J 5/18 428/220 |
| 2014/0248480 A1* | 9/2014 | Vinck et al. ............ B65B 11/00 428/218 |
| 2014/0272443 A1* | 9/2014 | Kinnan et al. .......... B32B 27/08 428/516 |
| 2015/0328058 A1* | 11/2015 | Cancio et al. .......... B32B 27/32 428/219 |
| 2017/0182728 A1* | 6/2017 | DePlace et al. ........ B32B 27/08 |
| 2017/0326852 A1* | 11/2017 | Chow et al. ............ B32B 27/32 |
| 2018/0104942 A1* | 4/2018 | Shen et al. ............ B32B 27/327 |
| 2018/0229485 A1* | 8/2018 | Gatos et al. ............ B32B 27/32 |
| 2019/0001649 A1* | 1/2019 | Mattsson ............... B32B 27/327 |

FOREIGN PATENT DOCUMENTS

| | | |
|---|---|---|
| WO | 2009040129 | 4/2009 |
| WO | 2010039687 | 4/2010 |
| WO | 2011076694 | 6/2011 |

* cited by examiner

COVER FILM, METHOD OF MAKING COVER FILM, AND METHOD OF USING COVER FILM FOR ENCLOSING COMPRESSED MATERIAL

BACKGROUND

The invention relates to a cover film for the fixing of material in compressing of round bales.

Silage is a feedstuff for livestock that is ordinarily preserved by lactic acid fermentation. Renewable raw materials for biogas can also be preserved by means of ensiling. For example, all green fodder, including grass (grass silage), corn (corn silage), clover, or grain (as whole plant silage) can be ensiled.

Today, the main methods used in silage production are flat or bunker silo methods, bale silage, or tube methods. Storage in tower silos has decreased sharply in importance.

Wrapped bale silage has become more widespread in recent years. This method is suitable in cases of large distances between the field and farm, as the high transport density of the compressed bales reduces the share of transport costs.

In the production of silage bales, the compressing process and the wrapping process following the compressing process are separate. A baler is first used to roll up the material. This can be done using rubberized belts (variable chamber press) or steel rolls (fixed chamber press). In conventional methods, when the bale has reached a certain size, it is tied using twine or nets, after which the back of the baler opens and the bale falls out. The bales usually have a diameter of 120 to 180 cm and are as a rule 120 cm wide. In grass silage bales, the mass may be up to 1 ton. After the compressing process, the silage bales can then be wrapped with a film using a bale wrapping device.

The invention relates to a cover film or net replacement film that is used in the compressing process for fixing the compressed material in the baler. In this system, the bale is compressed using a baler and wrapped with a film instead of a net. After the compressing process, the bale can then be wrapped with a further film so that a film-film system is used instead of a net-film system. Such film-film systems show less mold infestation and less loss of dry mass. In addition, the plant material can be compressed to a higher degree than with a net wrapping. In this system, instead of the nets that are ordinarily used, a film surrounds the circumference of the outer surface of the cylindrical bale in an air and water-tight manner when it leaves the baler. A further advantage of bales compressed in film is that the silage bales can be opened with a rapid knife cut, and no plastic fibers are left that can attach to the fodder-mixing trailer or turn up in the feed ration.

WO 2008/155129 A1 describes a pre-stretched film that can be used as a net replacement for wrapping bales. The film is produced by stretching in the longitudinal direction to at least 60% of its elongation at break, so that the film has a further stretching capacity in the longitudinal direction of at most 180%. This film is very stiff. When the film is further stretched for fixing the compressed bale, it becomes even stiffer and is therefore susceptible to mechanical defects. As a result of mechanical defects, moisture and oxygen can penetrate and spoil the feedstuff.

WO 2011/076694 describes a pre-stretched polyethylene film that has a longitudinal stretching ratio about 1:2 to about 1:4 and a longitudinal elongation capacity of at least 190%. The elongation capacity comprises an elastic component. The film can be used for wrapping a bale of compressed bulk material.

SUMMARY

The object of the invention is to provide a cover film as a net replacement for the compressing of bales that allows compact fixation of the bale and at the same time ensures high quality of the silage. The film is designed to be easy to process using the balers customary in the market. The film is also characterized by a long service life for silage application and the lowest production costs possible. The film is designed to ensure simple opening of the silage bales, wherein the formation of plastic fibers that can attach to the fodder-mixing trailer or turn up in the feed ration is to be prevented.

These and other objects are achieved by the film according to the invention. The cover film comprises a content of a copolymer of more than 1 wt %, preferably more than 2 wt %, and in particular more than 3 wt % based on the entire film, wherein it is particularly favorable if the content of the copolymer is less than 40 wt %, preferably less than 30 wt %, and in particular less than 25 wt % based on the entire film.

Preferably, the copolymer is a plastomer or a thermoplastic elastomer that combines the rubber-elastic properties of an elastomer with the processability of a thermoplastic. It has been found to be advantageous if the plastomer is a linear α-olefin (LAO) or a normal α-olefin (NAO). In a particularly favorable embodiment of the invention, it is an ethylene/α-olefin. For copolymerization with the ethylene, an α-olefin from the group 1-hexene, 1-heptene, 1-octene, 1-nonene, and 1-decene is preferably used, wherein it has been found to be particularly advantageous if the plastomer is formed by copolymerization of ethene with a higher α-olefin, in particular 1-butene or 1-hexene and/or 1-octene. It has been found to be particularly favorable if ethene is copolymerized with 1-octene.

Preferably, the plastomer is a copolymer of ethene with (ω-1)-methyl-α-olefin or isomeric linear α-olefin, wherein the plastomer is preferably a copolymer of ethene and isomeric octene. In a particularly favorable embodiment of the invention, the plastomer is a metallocene-catalyzed copolymer.

Preferably, the copolymer is a metallocene polyolefin, in particular a metallocene polyethylene that has a density of 0.863 to 0.935 g/cm$^3$ and is thus an mPE-LLD. mPE-LLDs can be produced with widely varying densities and melt indices. Metallocene polyethylenes with densities of 0.886 to 0.935 g/cm$^3$ are preferably used in the invention as copolymers.

It has been found to be particularly favorable if the copolymer is produced by solution polymerization by means of a metallocene catalyst.

Preferably, the cover film has at least three layers. It has been found to be favorable if the outer layers do not comprise a significant content of a copolymer, and preferably no polymer whatsoever, in particular no plastomer.

The term not a significant content is understood to refer to a content of less than 0.5 wt %, in particular less than 0.1 wt %, and preferably less than 0.05 wt % of a copolymer.

The cover film according to the invention is characterized by increased flexibility. It has been found to be particularly favorable if an inner layer comprises a content of a copolymer of more than 5%, preferably more than 8%, in particular more than 10% and/or less than 50 wt %, preferably less than 40 wt %, and in particular less than 35 wt %. In a particularly advantageous embodiment of the invention, a middle layer comprises a significant content of a copolymer, in particular a plastomer. This gives rise to a cover film as a net replacement that has a core that is both elastic and tough. In the variant in which the outer layers comprise no significant content of a plastomer, no adhesive effect is present in the outer layers, effectively preventing adhesion to the wrapped roll or interlocking. The double bond of the α-olefin, in particular if it is a 1-octene, increases the reactivity of the polymer and thus promotes binding of the film layer to adjacent layers.

In a particularly favorable embodiment of the invention, the cover film is stretched at a temperature of more than 80° C., preferably more than 90° C., and in particular more than 100° C. The cover film is thus a hot-stretched film. This hot stretching process causes orientation of the polymer chains in the stretching direction. It has been found to be particularly favorable if the film is stretched in the longitudinal direction.

In a variant of the invention, the cover film is first blown in a coextrusion process. The film tube produced is divided longitudinally, with no interlocking taking place. After this, the rolls obtained are individually stretched in an MDO (machine direction orientation) unit. According to the invention, heat is applied to the film before stretching so that hot stretching is carried out.

Monoaxial stretching is preferably carried out. Alternatively, a biaxial film stretching unit can also be used. In the stretching process, the film is drawn between rollers rotating at different speeds.

It has been found to be particularly favorable if the temperature during stretching is less than 150° C., preferably less than 140° C., and in particular less than 130° C.

Surprisingly, it was found that the cover film shows particularly favorable properties if it is stretched within a temperature range in which at least one copolymer is in a molten state. It has been found to be particularly favorable if the other polymer components of the film are in a non-molten state.

Preferably, stretching is carried out at a temperature close to the crystallite melting point of the film. In particular, it has been found to be favorable if the cover film is stretched within a temperature range that is between 40° C. and 5° C. below the crystallite melting point of the film.

Preferably, the starting film is heated by a heating cylinder. In a particularly favorable variant of the invention, the film is stretched within a temperature range of between 30° C. and 10° C. below the crystallite melting point of the film, in particular in a range between 25° C. and 15° C. below the crystallite melting point of the film.

It is known that although polymers do not have a sharply defined melting point, they have a melting range within which a crystalline melting point can be assigned in the crystalline regions of the polymer. This crystallite melting point is always higher than the melting point or melting range of the non-crystalline components. The molten state is described in that the shear modulus tends toward zero. In the case of polymers having crystalline regions, the latter are then no longer detectable.

For example, the shear modulus can be determined according to ISO 6721-1 & 2. The cover film according to the invention is stretched within a temperature range in which molecular movement is already thermally activated or promoted. The molecular chains can thus be displaced relative to one another without tearing. A further effect of this temperature application is a reduction in constriction due to the tension exerted on the film. After this, the orientation of the film is fixed at constant temperature and tension, and the film is then rapidly cooled.

In a preferred variant of the invention, the cover film shows restoring forces for further compression of the wrapped bale. The invention thus also comprises a method for the compressing of material in which the material is compressed in a chamber into a bale, and the cover film according to the invention is then further stretched. The film is then positioned around the bale under tension in direct contact with the compressed bulk material and then wrapped around the bale under tension with at least 1.5, preferably 2, and in particular 2.5 turns. In use of the film according to the invention, virtually no expansion of the bale takes place when the bale is removed from the chamber.

In a particularly favorable variant of the invention, even further compression is achieved by means of the film. It is particularly favorable if further compression is achieved of at least 0.5%, preferably 1%, and in particular 1.5% of the diameter compared to the diameter with which the bale leaves the compression chamber. The bale ordinarily leaves the compression chamber with a diameter that is somewhat larger than the theoretical diameter of the compression chamber. In this manner, use of the film according to the invention allows more compact bales to be obtained than in compressing in a net or with conventional cover films.

According to the invention, the cover film is pre-stretched in a selected temperature range. This is ordinarily monoaxial stretching in the machine direction orientation (MDO).

In an advantageous variant of the invention, the film has at least three layers, wherein preferably at least one inner layer comprises a significant content of a copolymer, in particular a plastomer.

It has been found to be advantageous if the thickness of the film is less than 20 μm, in particular less than 18 μm, and in particular less than 16 μm.

The film according to the invention is preferably produced according to the following steps:
  blow extrusion to form a film tube,
  division of the slip film tube,
  stretching in an MDO unit in the longitudinal direction at a temperature in a range of between 40° below the crystallite melting point and 5° C. below the crystallite melting point.

The film according to the invention allows easy opening, even of frozen bales, with the bale cutter or gripper, so that it is not necessary to get off the tractor in order to separate the net from frozen feed. This ensures higher film stability on the outer surface, which provides better protection during storage and transport. This results in dimensionally stable covered silage bales. No additional adhesive additives are required in order to ensure trouble-free wrapping.

The film according to the invention is suitable for harvest storage in the agricultural field, for example of chipped corn, sugar beet pulp, compound feed, spent grain, or grass silage. Moreover, the film according to the invention can be effectively used in special applications of shredded plastic waste or crushed household waste. The film is usable in all stationary and mobile round bale combination presses with film feed. In such cases, both edge-to-edge and over-the-edge performance can be used.

BRIEF DESCRIPTION OF THE DRAWINGS

Further features and advantages of the invention can be derived from the description of an example using drawings and from the drawings themselves.

The figures show the following.

DETAILED DESCRIPTION

Figure 1:
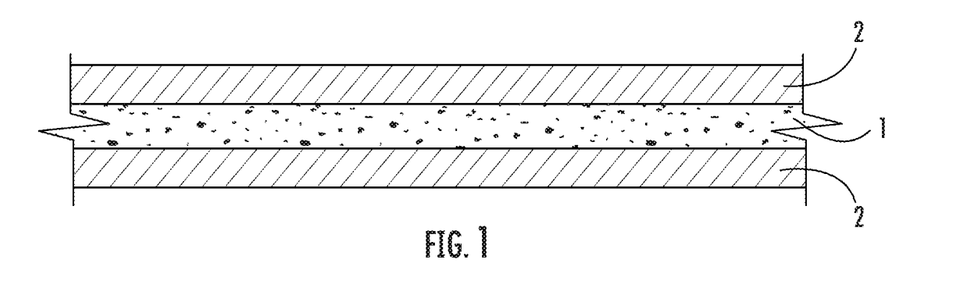
FIG. 1 is a sectional view through a cover film according to the invention.

FIG. 1 shows a sectional view through a variant of a cover film according to the invention. The film is a coextruded, multilayer blown film. According to the invention, an inner layer 1 comprises a significant content of a copolymer, in particular a plastomer. In the example, the copolymer is a metallocene-catalyzed copolymer of ethene and 1-octene. The ethene/1-octene copolymer has a content of 25 wt % in the inner layer 1 and a density of 0.902 g/cm$^3$. The layer further comprises a content of 75% of a linear low-density polyethylene (LLDPE) with a density of 0.931 g/cm$^3$ and a melting point of 127° C. The content of the copolymer based on the entire film is 15 wt %.

The two outer layers 3 contain no copolymer, in particular no plastomer. They are composed of 69 wt % of an LLDPE with a density of 0.923 g/cm$^3$, 30 wt % of a polyethylene with a density of 0.925 g/cm$^3$, and 1 wt % of a processing auxiliary master batch.

The thickness of the film in the example is 15 μm.

Figure 2:
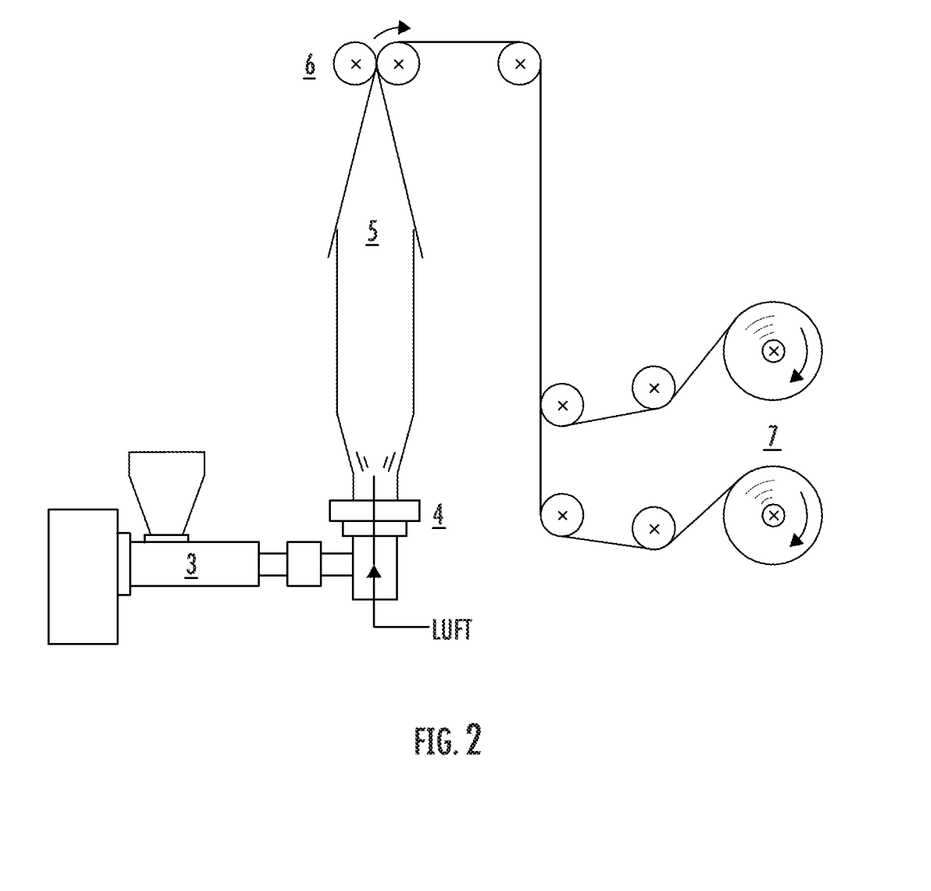
FIG. 2 is a schematic diagram of blow extrusion.

FIG. 2 shows a first stage of the method for producing the cover film. Blow extrusion is carried out in this first stage. The melt exiting the extruder 3 is formed into a tube by means of a ring nozzle 4. The tube is then expanded by blowing in air.

The film tube is withdrawn at a speed that is greater than the discharge speed of the melt. When the temperature drops below the melting temperature of the film, the thickness and circumference of the tube are fixed. In a unit 5, the tube is laid flat and merged between two rollers 6. These squeezing rollers prevent air from penetrating into the film tube that has been laid flat and at the same time withdraw the film tube from the nozzle. The film is then cut, and the film sections obtained in this manner are rolled up in a unit 7. In this first stage of the method, the tube is divided longitudinally into four sections. No interlocking occurs.

Figure 3:
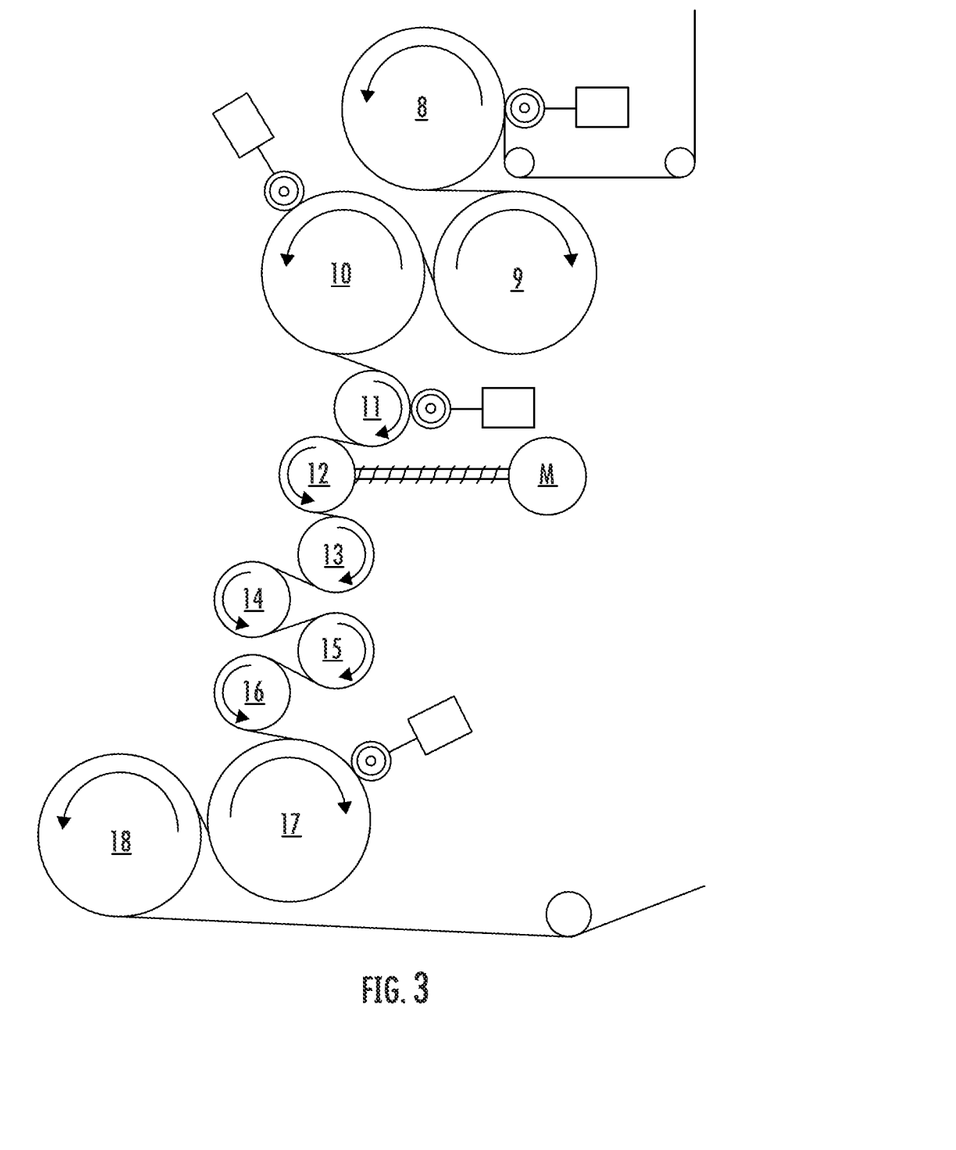
FIG. 3 is a schematic diagram of a system for stretching of the film (an MDO system)

FIG. 3 shows a schematic diagram of the second stage of the method for producing the cover film according to the invention. The unit used is an MDO unit with preheating rollers 8, 9, and 10, wherein rollers 8 and 9 have a temperature of 105° C. and roller 10 has a temperature of 108° C. The system further comprises stretching rollers 11 and 12 that rotate at different speeds and thus stretch the film. Stretching roller 11 turns at a lower rotational speed than stretching roller 12, allowing a stretching ratio of approx. 2.5:1 to 3:1 to be achieved. The stretching rollers have a temperature of 105 to 108° C. In this manner, a temperature is applied to the film during stretching that is close to the crystallite melting point.

Fixing rollers 13, 14, 15, and 16 are positioned after the stretching rollers 11, 12 that have a temperature of approx. 107° C. The temperature of the film is then sharply reduced via cooling rollers 17, 18. The cooling rollers have a temperature of approx. 40° C.

Figure 4:
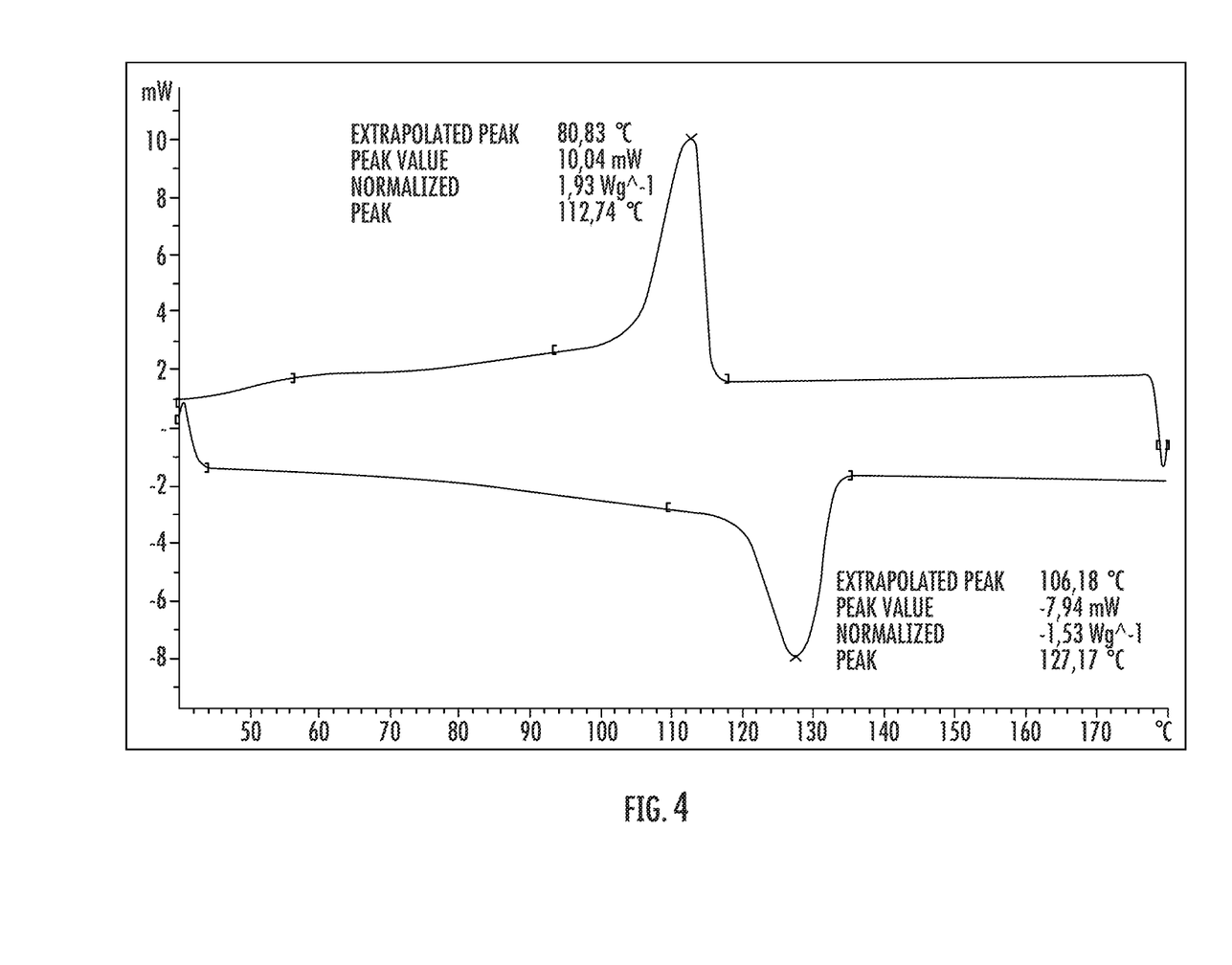
FIG. 4 is a DSC diagram of a sample of the film.

FIG. 4 shows an evaluation of a DSC (differential scanning calorimetry) measurement of a sample of the film. The peaks indicate the melting temperature of the film. The lower curve results from the heating phase and the upper curve from the cooling phase. The temperature set in the system for the stretching process is approx. 20° C. below the melting temperature of the film. In this range, the molecular movement is already thermally activated or promoted. The molecular chains can thus be displaced relative to one another without tearing. A further effect of this temperature application is a reduction in constriction due to the tension exerted on the film.

Figure 5:
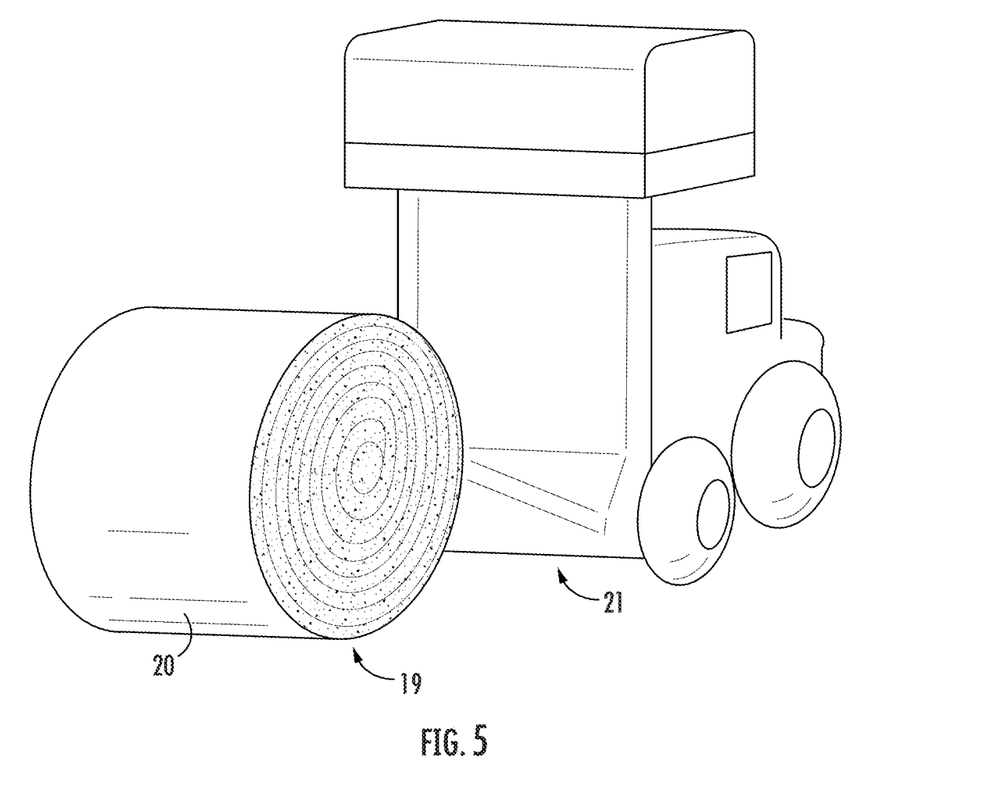
FIG. 5 shows a baler with a bale compressed in cover film.

FIG. 5 shows a cylindrical round bale 19 that is wrapped on its outer surface with the film according to the invention 20. The wrapping process takes place in a baler 21, wherein the bale compressed in the cover film falls from the baler onto the field.

The invention claimed is:

1. A cover film for enclosing bales of compressed material, the cover film having been stretched, and the cover film comprising:
    an inner layer and an outer layer;
    the inner layer comprises:
        a copolymer of an ethylene and an α-olefin, wherein the α-olefin is selected from the group consisting of 1-butene, 1-hexene, 1-heptene, and 1-octene, and is used for copolymerization with the ethylene;
        a proportion of said copolymer is more than 5% by weight and less than 50% by weight of the inner layer; and
        a linear polyethylene; and
    the outer layer does not have any significant proportion of said copolymer.

2. The cover film according to claim 1, wherein a proportion of the copolymer is less than 40% by weight of the inner layer.

3. The cover film according to claim 1, wherein the copolymer is a plastomer.

4. The cover film according to claim 1, wherein the copolymer is a thermoplastic elastomer.

5. The cover film according to claim 1, wherein the copolymer is at least one of a copolymer of ethylene with at least one of an (ω-1)-methyl-branched α-olefin or an isomeric linear α-olefin.

6. The cover film according to claim 1, wherein the copolymer is a copolymer of ethene and octene.

7. The cover film according to claim 1, wherein the copolymer is a metallocene-catalyzed copolymer.

8. The cover film according to claim 1, wherein the copolymer is a metallocene polyethylene (mPE-LLD) with a density of 0.886 to 0.935 g/cm$^3$.

9. The cover film according to claim 1, wherein the inner layer of the film comprises a proportion of the copolymer of more than 8% by weight of the inner layer.

10. The cover film according to claim 9, wherein the inner layer comprises a proportion of the copolymer of less than 40% by weight of the inner layer.

11. The cover film according to claim 1, wherein the film (20) is stretched at a temperature of more than 80° C.

12. The cover film according to claim 11, wherein the cover film (20) is stretched at a temperature of less than 150° C.

13. The cover film according to claim 1, wherein the cover film is stretched at a temperature at which the copolymer is in molten form.

14. The cover film according to claim 13, wherein the cover film is stretched at a temperature at which all components other than the copolymer are in non-molten form.

15. The cover film according to claim 13, wherein the cover film is stretched at between 5 and 20° C. below the crystallite melting point of the film.

16. A combination of a bale of compressed material wrapped with the cover film of claim 1, wherein the cover film has restoring forces for further compression of the wrapped bale.

17. The combination according to claim 16, wherein the further compression is at least 0.5% of a diameter of the bale.

18. The cover film according to claim 1, wherein the film comprises at least three layers.

19. The cover film according to claim 1, wherein a thickness of the film is less than 20 µm.

20. A method for enclosing bales of compressed material, comprising the following steps:
providing the cover film of claim 1;
stretching the cover film;
compressing material in a chamber to form a bale of compressed material having a bale diameter;
wrapping the cover film around the compressed bale in the chamber; and
removing the wrapped bale from the chamber, and the cover film further compressing the bale by at least 0.5% of the diameter of the bale compared to the diameter of the bale on removal from the chamber.

21. A method for producing a cover film, comprising the following steps:
blow extruding a copolymer and other components to form a film tube;
dividing the film tube into film sheets, the film sheets each including an outer layer and an inner layer;
the inner layer comprises:
said copolymer, and said copolymer comprises an ethylene and an α-olefin, wherein the α-olefin is selected from the group consisting of 1-butene, 1-hexene, 1-heptene, and 1-octene, and is used for copolymerization with the ethylene;
a proportion of said copolymer is more than 5% by weight and less than 50% by weight of the inner layer; and
a linear polyethylene; and
the outer layer does not have any significant proportion of said copolymer, and
stretching the film sheets in an MDO unit in a longitudinal direction at a temperature at which the copolymer is in molten form and the remaining components are in non-molten form.

22. The method of claim 21, further comprising installing the cover film as a net replacement for fixing of compressed bulk material in compressing of a bale.

23. A roll of a film produced according to claim 21 adapted for use as a net replacement for fixing material in baling.

* * * * *